United States Patent [19]
Kwon

[11] Patent Number: 5,475,443
[45] Date of Patent: Dec. 12, 1995

[54] ON-SCREEN DISPLAY CIRCUIT OF IMAGING SYSTEM

[75] Inventor: Hyun-Koo Kwon, Incheon, Rep. of Korea

[73] Assignee: Daewoo Electronics Co., Ltd., Seoul, Rep. of Korea

[21] Appl. No.: 325,733

[22] Filed: Oct. 19, 1994

[30] Foreign Application Priority Data

Oct. 20, 1993 [KR] Rep. of Korea .................. 93-21825

[51] Int. Cl.$^6$ .................................................. H04N 5/272
[52] U.S. Cl. ............................................. 348/569; 348/589
[58] Field of Search ..................................... 348/569, 570, 348/563, 589, 625, 628, 629, 252, 239; 358/183, 181, 162; H04N 5/272, 5/278, 5/262

[56] References Cited

U.S. PATENT DOCUMENTS 3,602,646  8/1971  Goldberg .............................. 348/589
4,338,624  7/1982  d'Hautecourt et al. ............... 348/569

Primary Examiner—David E. Harvey
Attorney, Agent, or Firm—Lowe, Price, LeBlanc & Becker

[57] ABSTRACT

An on-screen display (OSD) circuit suitable to be adapted in an imaging system is disclosed. The OSD circuit has a first and a second adders. The first adder produces a second OSD data signal by adding vertical edge compensation signal and a level-modified OSD data signal. The second adder produces a third OSD signal by adding the second OSD data signal, horizontal edge compensation signal and a blank luminance signal. The third OSD signal is inputted to a display device. This OSD circuit has a simple configuration to thereby reduce its manufacturing cost.

3 Claims, 3 Drawing Sheets

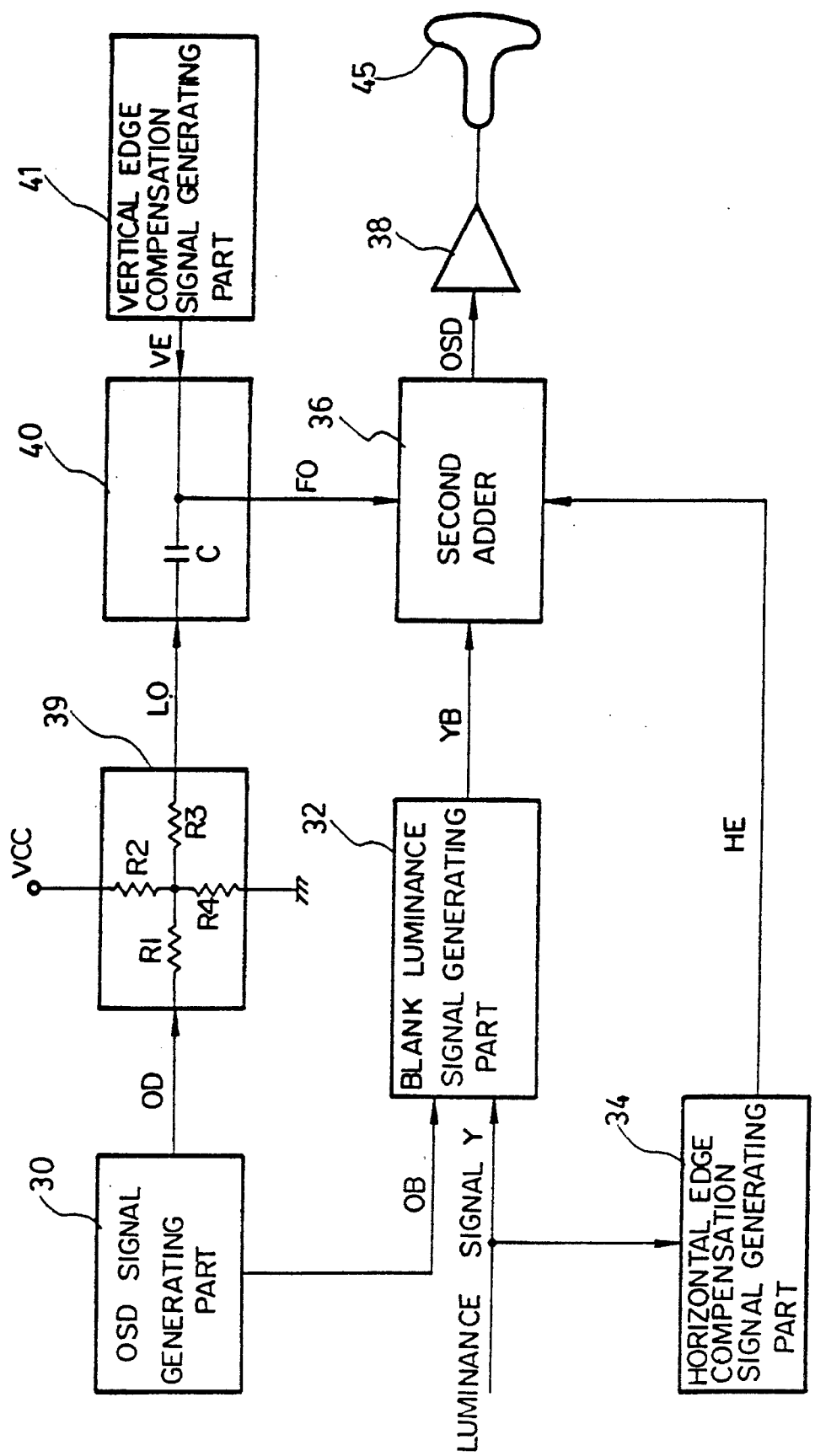

ON-SCREEN DISPLAY CIRCUIT OF IMAGING SYSTEM

BACKGROUND OF THE INVENTION

1. Field of the Invention

The present invention relates to an on-screen display (OSD) circuit of an imaging system. More particularly, the present invention relates to an on-screen display circuit having a simplified configuration.

2. Description of the Prior Art

Conventionally, in the imaging system such as camcorder, television receiver, monitor and the like, there is provided with an OSD function to display on a screen the numerals or the characters that represent a selected channel number, the time and date, the information for guiding a user, etc.

Generally, the imaging system produces a vertical edge compensation signal and a horizontal edge compensation signal. The vertical edge compensation signal changes an amplitude of luminance signal in accordance with the amplitude of black signal, in order to perform the OSD function that represents The characters or the numerals on the image display device.

FIG. 1 is a block diagram of a conventional OSD circuit applied to the imaging system.

As can see from FIG. 1, a luminance signal Y is inputted to a vertical edge compensation signal generating part 21, a horizontal edge compensation signal generating part 14 and an adder 16. Adder 16 sums the luminance signal Y, the vertical edge compensation signal from vertical edge compensation signal generating part 21, and the horizontal edge compensation signal from horizontal edge compensation generating part 14 and then outputs a first luminance signal to a gain amplifier 17. In gain amplifier 17, the first luminance signal is amplified to have a desired gain value and the amplified first luminance signal is inputted to first switching part 23.

When an OSD controller 10 does not receive an OSD control signal from a user, it controls a first and a second switching parts 22 and 23 so that the first luminance signal amplified in gain amplifier 17 may pass to reach a display device (not shown). However, when OSD controller 10 receives the OSD signal from the user, it supplies a blanking pulse and an OSD blanking signal to first switching part 23, and supplies a data pulse and an OSD data signal to second switching part 24. In first switching part 23, the amplified first luminance signal from gain amplifier 17 is blanked in accordance with the OSD blanking signal to define a blank leveled area of a display device for realizing the OSD function, thereby producing a blank luminance signal, which is inputted to second switching part 24. In second switching part 24 which receives the blank luminance signal, a blank leveled area defined by the blank luminance signal receives the OSD data signal thereby to produce a luminance-OSD signal which is inputted to the display device.

However, in the OSD circuit as described above, it is necessary to provide an OSD controlling circuit 29 including first and second switching parts 23 and 24 and OSD controlling part 22, for controlling the OSD blanking signal and the OSD data signal. Generally, the OSD circuit shown in FIG. 1 is formed on a single semiconductor chip. However, when the OSD circuit has the above switching parts, an additional element for driving the switching parts and thus the OSD circuit configuration becomes more complicated, thereby increasing the manufacturing cost. Therefore, it is preferable to eliminate the switching parts.

SUMMARY OF THE INVENTION

It is therefore an object of the present invention to provide an OSD circuit capable of simplifying its circuit configuration by elimination of the switching parts.

To achieve the above object, the OSD circuit according to this invention comprises:

an OSD signal generating part for producing an OSD blanking signal and a first OSD data signal;

a level modifying part for modifying a level of the OSD data signal from the OSD signal generating part and for outputting a level-modified OSD data signal;

a first adder for summing the level-modified OSD data signal and a vertical edge compensation signal to output a second OSD data signal;

a blank luminance signal generating part for producing a blank luminance signal by receiving the OSD blanking signal from the OSD signal generating part and a luminance signal; and a second adder for summing the first OSD data signal from first adder, the blank luminance signal from blank luminance signal generating part and the vertical edge compensation signal, and for producing a third OSD data signal. The third OSD data signal is outputted to a display device via a gain amplifier.

The OSD circuit according to the present invention has a simple configuration and thus its manufacturing cost can be reduced.

BRIEF DESCRIPTION OF THE DRAWINGS

The invention, both as to its organization and method of operation, together with further objects and advantages thereof may best be understood with reference to the following description taken in connection with the accompanying drawings, in which:

FIG. 2 is a block diagram for illustrating an OSD circuit according to one embodiment of the present invention.

DESCRIPTION OF THE PREFERRED EMBODIMENT

Hereinafter, the present invention will be explained in detail with reference to the accompanying drawings.

Figure 1:
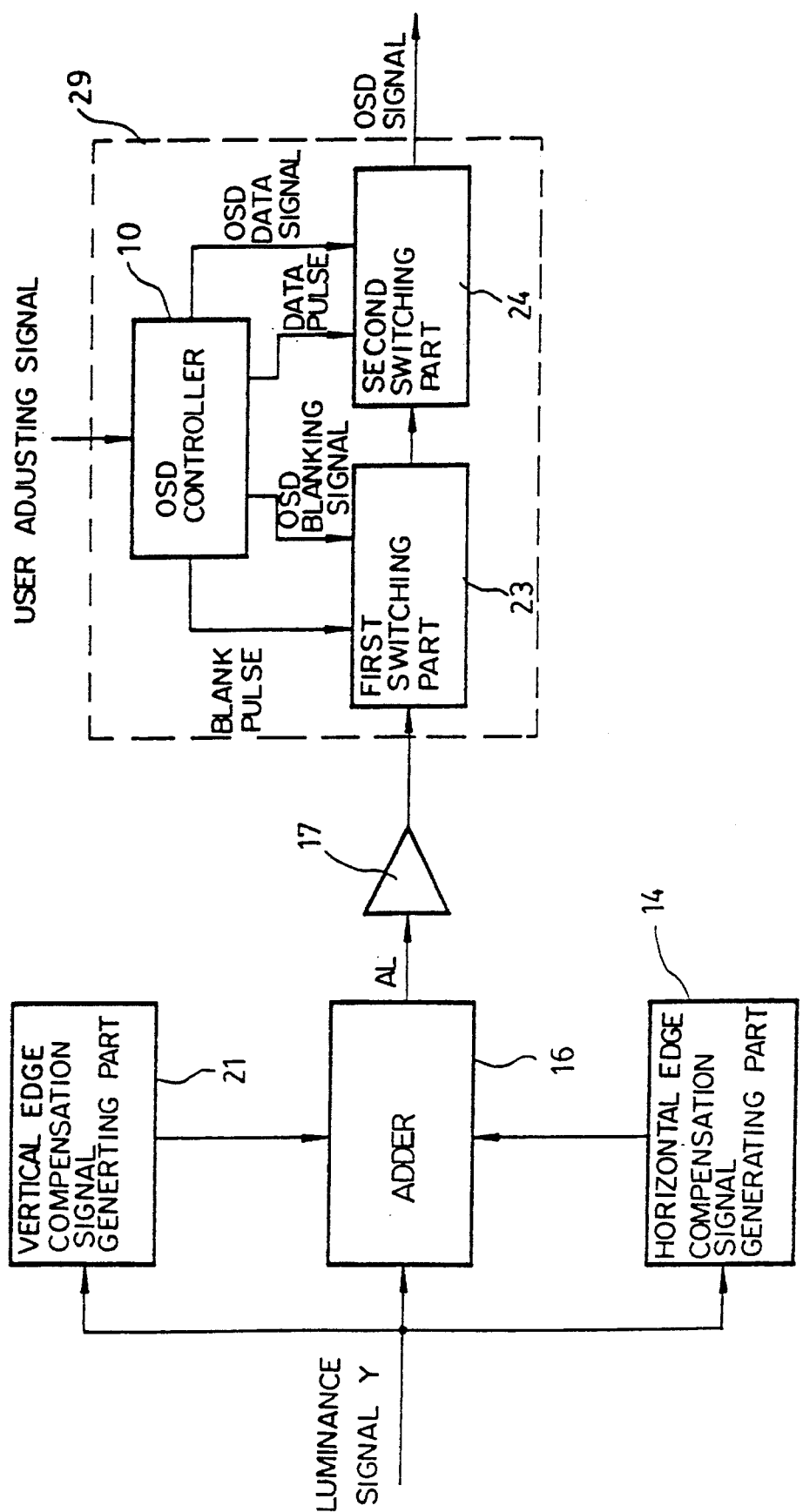
FIG. 1 is a block diagram for illustrating an OSD circuit according to the prior art.
Figure 3A:
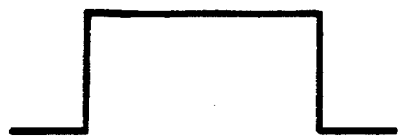
FIG. 3 is a wave form diagram for explaining an operation of the OSD circuit as shown in FIG. 2.
Figure 3B:
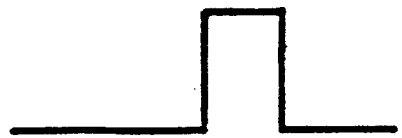
Figure 3C:
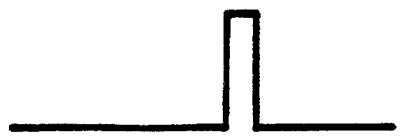
Figure 3D:
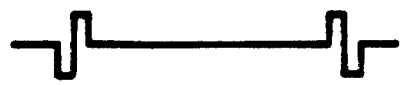
Figure 3E:
Figure 3F:
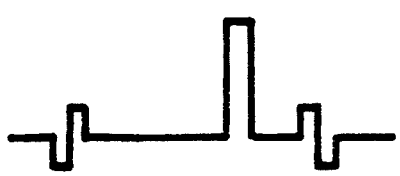
Figure 3G:

FIG. 2 is a block diagram of an OSD circuit for an imaging system according to one embodiment of the present invention. explanation of the OSD circuit shown in FIG. 2 is presented, referred to FIG. 3.

As shown in FIG. 2, in the OSD circuit, an OSD signal generating part 30 is provided in order to produce an OSD blank signal OB for defining an OSD area on a display device and an OSD data signal OD for performing an OSD function on the defined OSD area, in accordance with a user's control signal. Also, there is provided a level modifying part 39 comprised of a first, a second, a third and a fourth resistors, R1, R2, R3 and R4 for receiving the OSD data signal OD from OSD signal generating part 30, which adjusts the level of the OSD data signal to the level of the vertical edge compensation signal in order to sum the OSD data signal OD and the vertical edge compensation signal.

As shown in FIG. 2, first resistor R1 and second resistor R3 are serially connected with each other and second resistor R2 and fourth resistor R4 cross between first resistor R1 and second resistor R4. One end of second resistor R2 is connected to the power source Vcc and one end of fourth resistors R4 is connected to the ground. Second and fourth resistors R2 and R4 divide the voltage from the power source Vcc, and therefore the levels of the OSD data signal OD can be controlled by varying the values of resistors R2 and R4.

The OSD circuit includes a first adder 40 which sums the level adjusted OSD data signal LO from level modifying part 39 and a vertical edge compensation signal VE from vertical edge compensation signal generating part 41 and outputs a first OSD data signal FO.

The OSD blanking signal OB outputted from OSD signal generating part 30 is inputted to a blank luminance signal generating part 32. Blank luminance signal generating part 32 outputs a blank luminance signal YB by summing the OSD blanking signal OB and the luminance signal Y.

A second adder 36 receives the first OSD data signal FO from first adder 40, the blank luminance signal YB from OSD blank luminance signal generating part 32, and the horizontal edge compensation signal HE from a horizontal edge compensation signal generating part 34 produced according to the inputted luminance signal Y. Second adder 36 sums these signals, FO, YB and HE and produces an OSD luminance signal. This OSD luminance signal is amplified by a gain amplifier 38 and the gain-amplified OSD luminance signal is sent to a display device 45, where the OSD function is performed.

The luminance signal Y which is supplied to blank luminance signal generating part 32 and horizontal edge compensation signal generating part 34 is shown in (A) of FIG. 3. Blank luminance signal generating part 32 receives the luminance signal Y shown in (A) of FIG. 3 and the OSD data signal OB shown in (C) of FIG. 3, and then outputs the blank luminance signal YB shown in (E) of FIG. 3 to second adder 36.

The OSD data signal OD produced in OSD signal generating part 30 is shown in (C) of FIG. 3 and the signal is inputted into level modifying part 39. Because level modifying part 19 comprises first, second, third and fourth resistors R1, R2, R3 and R4, the outputted level of the inputted OSD data signal OD can be adjusted by controlling the resistance values of the resistors R1, R2, R3 and R4. The outputted OSD data signal LO of which the level of OSD data signal LO has been adjusted in level modifying part 39 is outputted to first adder 40. First adder 40 sums the level-adjusted OSD data signal LO and a vertical edge compensation signal VE shown in (D) of FIG. 3 outputted from vertical edge compensation signal generating part 41 and then outputs a first OSD data signal FO as shown in (F) of FIG. 3 to second adder 36.

First adder 40 can be simply formed by using a wiring connection. First adder 40 includes a capacitor C which eliminates direct current components among the level-adjusted OSD data signal LO outputted from level modifying part 39. In second adder 36, an OSD signal OSD shown in (G) of FIG. 3 is produced by summing the first OSD data signal FO from first adder 20, the horizontal edge compensation signal HE from a horizontal edge compensation signal generating part 34 and the luminance-blank signal YB from blanking signal generating part 32.

The OSD signal OSD is gain-amplified by gain amplifier 38 and is sent to display device 45.

As mentioned above, the OSD circuit applied to the imaging system in accordance with the present invention has a level modifying part and a first adder instead of the first and second switching parts of the prior art and therefore, has an advantage that its configuration can be simplified and its manufacturing cost can be reduced.

It can be understood although the preferred embodiments of the invention have been described in detail above, many modifications and variations could be effected therein by one with ordinary skill in the art without departing from the spirit and scope of the invention as defined by the appended claims.

What is claimed is:

1. An on-screen display (OSD) circuit of an imaging system, said OSD circuit comprising:

an OSD signal generating part for producing an OSD blanking signal and a first OSD data signal;

a level modifying part for modifying a level of said OSD data signal from said OSD signal generating part and for outputting a level-modified OSD data signal;

a first adder for summing said level-modified OSD data signal and a vertical edge compensation signal to output a second OSD data signal;

a blank luminance signal generating part for producing a blank luminance signal by receiving said OSD blanking signal from said OSD signal generating part and a luminance signal; and a second adder for summing said first OSD data signal from first adder, said blank luminance signal from blank luminance signal generating part and said vertical edge compensation signal, and for producing a third OSD data signal, said third OSD data signal being outputted to a display devices via a gain amplifier.

2. The OSD circuit according to claim 1, wherein said level modifying part comprises a plurality of resistors and adjusts a level of said first OSD data signal by varying resistances of said resistors.

3. The OSD circuit according to claim 1, wherein said first adder includes a capacitor for eliminating a direct current component among said second OSD data signal outputted from said level modifying part.

* * * * *